(12) United States Patent
Kang et al.

(10) Patent No.: US 9,399,578 B2
(45) Date of Patent: Jul. 26, 2016

(54) CNT AND METHOD FOR MANUFACTURING THEREOF

(71) Applicant: LG CHEM, LTD., Seoul (KR)

(72) Inventors: Kyung Yeon Kang, Daejeon (KR); Jin Do Kim, Daejeon (KR); Sung Jin Kim, Daejeon (KR); Jae Keun Yoon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/348,833

(22) PCT Filed: Jan. 9, 2013

(86) PCT No.: PCT/KR2013/000157
§ 371 (c)(1),
(2) Date: Mar. 31, 2014

(87) PCT Pub. No.: WO2013/105779
PCT Pub. Date: Jul. 18, 2013

(65) Prior Publication Data
US 2014/0255698 A1    Sep. 11, 2014

(30) Foreign Application Priority Data

Jan. 11, 2012 (KR) .................. 10-2012-0003420
Jan. 4, 2013 (KR) .................. 10-2013-0001078

(51) Int. Cl.
*B32B 9/00* (2006.01)
*C01B 31/02* (2006.01)
(Continued)

(52) U.S. Cl.
CPC ........... *C01B 31/0233* (2013.01); *B01J 21/185* (2013.01); *B01J 23/882* (2013.01);
(Continued)

(58) Field of Classification Search
CPC .............. C01B 31/022; C01B 31/0293; C01B 2202/00
USPC ................... 428/408; 423/447.1; 977/742
See application file for complete search history.

(56) References Cited

U.S. PATENT DOCUMENTS

2003/0004058 A1*  1/2003  Li et al. ................. 502/258
2005/0074392 A1*  4/2005  Yang et al. ............. 423/447.3
(Continued)

FOREIGN PATENT DOCUMENTS

CN   102196860 A    9/2011
JP   2010-540220 A  12/2010
(Continued)

OTHER PUBLICATIONS

Advanced Powder Technology, "Synthesis of Multi-Walled Carbon Nanotubes using Co—Fe—Mo/ Al2O3 catalytic powders in a fluidized bed reactor" vol. 21, Mar. 1, 2010, Jeong S W et al. pp. 93-99.

*Primary Examiner* — Daniel H Miller
(74) *Attorney, Agent, or Firm* — Dentons US LLP (57) ABSTRACT

Disclosed are carbon nanotubes and a method for manufacturing the same wherein the carbon nanotubes (CNTs) which comprise a three-component carbon nanotube catalyst containing a catalytic component and an active component and have a potato or spherical shape with a particle diameter distribution (Dcnt) of 0.5 to 1.0 can be manufactured at a high yield using an impregnated supported catalyst by simultaneously removing activity and a fine powder of the impregnated supported catalyst in an attempt to solve a drawback of conventional impregnation methods for producing CNTs, namely, the difficulty in improving a yield of CNTs.

14 Claims, 3 Drawing Sheets

(51) Int. Cl.
  *B01J 23/882* (2006.01)
  *B01J 35/00* (2006.01)
  *B82Y 30/00* (2011.01)
  *B82Y 40/00* (2011.01)
  *B01J 21/18* (2006.01)
  *B01J 37/02* (2006.01)
  *B01J 37/03* (2006.01)

(52) U.S. Cl.
  CPC ............ *B01J 35/002* (2013.01); *B82Y 30/00* (2013.01); *B82Y 40/00* (2013.01); *B01J 35/0026* (2013.01); *B01J 37/0203* (2013.01); *B01J 37/0205* (2013.01); *B01J 37/0236* (2013.01); *B01J 37/03* (2013.01); *B01J 2523/00* (2013.01); *C01B 2202/34* (2013.01); *C01B 2202/36* (2013.01); *Y10T 428/2982* (2015.01); *Y10T 428/30* (2015.01)

(56) References Cited

U.S. PATENT DOCUMENTS

| | | | |
|---|---|---|---|
| 2006/0177659 A1* | 8/2006 | Chen et al. | 428/403 |
| 2009/0068470 A1* | 3/2009 | Choi et al. | 428/403 |
| 2009/0214800 A1* | 8/2009 | Saito | 427/577 |
| 2010/0158788 A1 | 6/2010 | Kim et al. | |
| 2010/0266478 A1 | 10/2010 | Kim et al. | |
| 2012/0228157 A1* | 9/2012 | Li et al. | 205/780 |

FOREIGN PATENT DOCUMENTS

| | | |
|---|---|---|
| KR | 10-2002-0023522 A | 3/2002 |
| KR | 10-0596676 A | 6/2006 |
| KR | 10-2009-0070087 A | 7/2009 |
| KR | 10-2010-0074002 A | 7/2010 |
| KR | 10-1007183 | 1/2011 |
| WO | 02-081371 A2 | 10/2002 |
| WO | 2010-047439 A1 | 4/2010 |

* cited by examiner

CNT AND METHOD FOR MANUFACTURING THEREOF

This application is a National Stage Application of International Application No. PCT/KR2013/000157, filed Jan. 9, 2013 and claims priority to and the benefit of Korean Patent Application No. KR 10-2012-0003420, filed on Jan. 11, 2012 and Korean Patent Application No. KR 10-2013-0001078, filed on Jan. 4, 2013, the disclosures of which are incorporated herein by reference in their entirety.

TECHNICAL FIELD

The present invention relates to carbon nanotubes and a method for manufacturing the same. More specifically, the present invention relates to carbon nanotubes and a method for manufacturing the same wherein the carbon nanotubes (CNTs) which comprise a three-component carbon nanotube catalyst containing a catalytic component and an active component, and have a potato or spherical shape with a particle diameter distribution (Dcnt) of 0.5 to 1.0 can be manufactured at a high yield using an impregnated supported catalyst by simultaneously removing activity and a fine powder of the impregnated supported catalyst in an attempt to solve a drawback of conventional impregnation methods for producing CNTs, namely, the difficulty in improving a yield of CNTs.

BACKGROUND ART

Carbon nanotubes (hereinafter, referred as to "CNTs") are understood to mean cylindrical carbon nanotubes having a diameter of 3 to 150 nm, preferably 3 to 100 nm, and a length of several times, i.e., at least 100 times the diameter. The carbon nanotubes consist of aligned carbon atom layers and have different types of cores. The carbon nanotubes are also called as carbon fibrils or hollow carbon fibers. Carbon nanotubes are industrially essential in the production of composites because of the size and specific properties thereof.

Carbon nanotubes are generally manufactured by arc discharge, laser ablation, chemical vapor deposition or the like. However, arc discharge and laser ablation are disadvantageously ill suited to mass-production and involve excessive preparation costs and laser purchase costs.

Furthermore, chemical vapor deposition has problems in that synthesis velocity is very low and synthesized CNT particles are extremely small in the case of using a gas-phase dispersion catalyst and there is a limit to bulk production of CNTs because space utilization inside a reactor is significantly reduced in the case of using a substrate-supported catalyst.

The catalytically active component of the catalyst generally has an oxide form, a partially or completely reduced form, or a hydroxide form and the catalyst may be a carbon nanotube catalyst, a co-precipitation catalyst or the like which is commonly used for productions of CNTs. Of these, the carbon nanotube catalyst is preferred because the carbon nanotube catalyst advantageously has a higher bulk density than a co-precipitation catalyst, reduces probability of generation of fine powder by attrition which may be generated during fluidization due to generation of little fine powder of 10 microns or less unlike the co-precipitation catalyst, and enables stable operation of the reactor due to superior mechanical strength of the catalyst.

In addition, as a method for producing a carbon nanotube catalyst, an impregnation method including mixing an aqueous metal solution and a support, followed by coating and drying is suggested. In this case, the produced catalyst has a disadvantage of limited catalyst loading. In addition, heterogeneous distribution of the active component and the catalytic component greatly affects CNT growth yield and CNT diameter distribution, but a method for controlling the heterogeneous distribution is not suggested to date.

In particular, in accordance with a conventional impregnation method, when carbon nanotubes are synthesized using a prepared supported catalyst, the yield is lower than 1,000% and is limited due to high load. In addition, the carbon nanotubes are a bundle type and thus have low bulk density, decreased reactive gas injection rate and thus reduced CNT productivity.

Accordingly, there is a need for research which is capable of synthesizing carbon nanotubes having a high bulk density at a high yield in spite of using a carbon nanotube catalyst.

DISCLOSURE

Technical Problem

Therefore, the present invention has been made in view of the above problems, and it is an object of the present invention to provide carbon nanotubes having a novel configuration and specific properties, and carbon nanotubes which provide improved bulk density and yield by solving a low carbon nanotube synthesis yield, which is the drawback associated with the use of a conventional carbon nanotube catalyst and controlling both activity and a fine powder of the catalyst, and a method for manufacturing the same.

Technical Solution

In accordance with one aspect of the present invention, the above and other objects can be accomplished by the provision of carbon nanotubes comprising a three-component carbon nanotube catalyst containing a catalytic component and an active component, wherein the carbon nanotubes have a potato or spherical shape having a particle diameter distribution (Dcnt) of 0.5 to 1.0.

In accordance with another aspect of the present invention, provided is a method for manufacturing carbon nanotubes including sequentially mixing an active component precursor aqueous solution with a multicarboxylic acid component and a catalytic component precursor aqueous solution to prepare a clear aqueous metal solution and mixing the clear aqueous metal solution with an alumina support, vacuum-drying the resulting mixture at 40 to 80° C. and then baking the mixture at 650 to 800° C. to obtain a carbon nanotube catalyst in which a catalytic component and an active component are impregnated in and coated on the surface and pores of the alumina support, loading the carbon nanotube catalyst into a fluidized bed reactor and injecting at least one carbon source selected from C1-C4 saturated or unsaturated hydrocarbons, or the carbon source and a mixed gas of oxygen and nitrogen into the reactor at 500 to 900° C., and growing carbon nanotubes on the surface of the catalyst by chemical vapor synthesis using decomposition of the carbon source.

Hereinafter, the present invention will be described in detail.

The carbon nanotubes according to the present invention comprise a three-component carbon nanotube catalyst containing a catalytic component and an active component, wherein the carbon nanotubes have a potato or spherical shape having a particle diameter distribution (Dcnt) of 0.5 to 1.0.

Specifically, the particle diameter distribution (Dcnt) is defined by the following Equation 1 and for example provides the specific scope of the present invention, as demonstrated by Example given later.

$$Dcnt=[Dn90-Dn10]/Dn50 \quad \text{[Equation 1]}$$

wherein Dn90 is a number average particle diameter which is measured based on 90% in an absorption mode using a Microtrac particle diameter analyzer after CNTs are immersed in distilled water and then allowed to stand for 3 hours, Dn10 is a number average particle diameter measured based on 10% under the same conditions, and Dn50 is a number average particle diameter measured based on 50% under the same conditions.

The particle diameter distribution is for example 0.55 to 0.95 or 0.55 to 0.90.

In addition, the carbon nanotubes are a non-bundle type having an ellipticity of 0.9 to 1.0.

Figure 2:
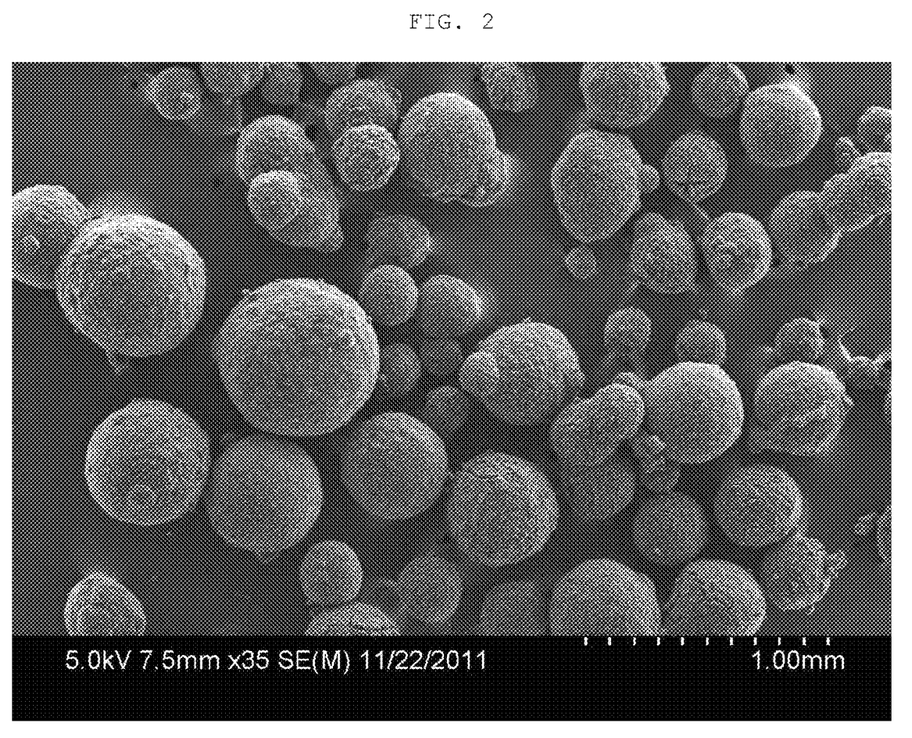
FIG. 2 is an SEM image (×35) showing CNTs synthesized using the catalyst of Example 1 according to the present invention.

The ellipticity range and the non-bundle type can be achieved only by a specific process of the three-component carbon nanotube catalyst suggested by the present invention (see FIG. 2). Specifically, the ellipticity is defined as the following Equation 2.

Ellipticity=the shortest diameter passing through center of CNT/the longest diameter passing through center of CNT. [Equation 2]

As used herein, the term "non-bundle" refers to a shape other than a bundle or rope shape in which carbon nanotubes are entangled with one another, unless otherwise mentioned.

In addition, the carbon nanotubes of the present invention have a bulk density of 80 to 250 kg/m$^3$.

Specifically, the bulk density is defined by the following Equation 3 and a fine powder of the three-component carbon nanotube catalyst is little and a density distribution of carbon nanotubes grown therefrom thus provides the specific scope of the present invention.

Bulk density=CNT weight (kg)/CNT volume (m$^3$) [Equation 3]

In addition, the carbon nanotubes have a particle diameter or an average particle diameter of 300 to 800 μm and a strand diameter of the carbon nanotubes is 10 to 50 nm.

For example, the three-component carbon nanotube catalyst is selected such that the number of moles (x) of a first catalytic component, the number of moles (y) of a second catalytic component and the number of moles (z) of a Mo component satisfy the ranges of 30≤x+y≤53, 0.1≤y/[x+y]≤0.95 and 3≤z≤13, based on 100 moles of an alumina support and provides a carbon nanotube yield of 2,000% or higher.

In another example, the three-component carbon nanotube catalyst is selected such that the number of moles (x) of the first catalytic component, the number of moles (y) of the second catalytic component and the number of moles (z) of the Mo component satisfy the ranges of 35≤x+y≤53, 0.1≤y/[x+y]≤0.9 and 5.3≤z≤13, based on 100 moles of the alumina support, is selected such that the number of moles (x) of the first catalytic component, the number of moles (y) of the second catalytic component and the number of moles (z) of the Mo component satisfy the ranges of 30≤x+y≤44, 0.1≤y/[x+y]≤0.9 and 3≤z≤8.5, based on 100 moles of the alumina support, or is selected such that the number of moles (x) of the first catalytic component, the number of moles (y) of the second catalytic component and the number of moles (z) of the Mo component satisfy the ranges of 35≤x+y≤44, 0.1≤y/[x+y]≤0.8 and 5.3≤z≤8.5, based on 100 moles of the alumina support.

The three-component carbon nanotube catalyst has a structure in which the catalytic component and the active component are coated as a monolayer or multilayer on the surface of the alumina support or pores thereof, and improves a yield upon growth of carbon nanotube, and provides much denser density distribution of grown carbon nanotubes than conventional carbon nanotubes due to considerably smaller measured value of ultrasonic fine powder (based on 32 μm) of 10% or less. For example, a measured value of a number average particle diameter of the ultrasonic fine powder (based on 32 μm) may be 5% or less.

The three-component carbon nanotube catalyst comprises an alumina support ($Al_2O_3$), a catalytic component, multicarboxylic acid and an active component, and is specifically a mixture solution obtained by adding multicarboxylic acid to the active component and then adding the catalytic component thereto to prepare a clear aqueous metal solution, and then adding the clear aqueous metal solution to the alumina support.

The clear aqueous metal solution means a precipitate-free aqueous solution. The term "precipitate" means a dark yellow precipitate such as $Fe(MoO)_3$, produced by reaction of $Fe^{3+}$ with $3MoO^-$ at room temperature, when an Fe precursor (iron nitrate) as a catalytic component is added to water and a Mo precursor (ammonium molybdate) as an active component is then added thereto.

In the present invention, multicarboxylic acid is used and an addition order thereof is controlled such that the multicarboxylic acid is added to a Mo component before an Fe or Co component is added, thereby advantageously inhibiting formation of precipitate, reducing an area of the precipitate which occupies the support surface and improving activity of the catalyst.

In particular, a concentration of the clear aqueous metal solution according to the present invention is preferably 0.1 to 0.4 g/ml or 0.1 to 0.3 g/ml in view of reactivity.

The catalytic component used in the present invention comprises at least one selected from Fe and Ni as a first catalyst component, and Co as a second catalyst component, and for example comprises, as the first catalyst component, at least one selected from the group consisting of Fe salts, Fe oxides, Fe compounds, Ni salts, Ni oxides and Ni compounds and, as the second catalyst component, at least one selected from the group consisting of Co salts, Co oxides and Co compounds and is for example nitride such as $Fe(NO_3)_2 \cdot 6H_2O$, $Fe(NO_3)_2 \cdot 9H_2O$, $Ni(NO_3)_2 \cdot 6H_2O$ or $Co(NO_3)_2 \cdot 6H_2O$.

In addition, the active component used in the present invention is for example Mo, is for example a Mo salt, Mo oxide or a Mo compound and is for example nitride, such as $(NH_4)_6Mo_7O_{24} \cdot 4H_2O$, which may be dissolved in distilled water before use.

A content of the active component may be 0.2 to 4 wt %, based on 100 wt % in total of the aqueous metal solution, as suggested as a concentration of the aqueous solution above.

The multicarboxylic acid component used in the present invention may comprise at least one selected from the group consisting of dicarboxylic acid, tricarboxylic acid and tetracarboxylic acid. In addition, a content of the multicarboxylic acid component may be 0.1 to 1.5 wt %, based on 100 wt % in total of the aqueous metal solution. A molar ratio of the multicarboxylic acid to the active component may be 0.2 to 0.5.

The mixture solution may be obtained as a supported catalyst in which the Fe, Co and Mo components are impregnated in and coated on the surface and pores of the alumina support through vacuum-drying and then baking.

The carbon nanotubes may be for example manufactured by a method including adding a multicarboxylic acid component to an active component precursor aqueous solution, mixing the resulting mixture with a catalytic component precursor aqueous solution to obtain a clear aqueous metal solution and mixing the clear aqueous metal solution with an alumina support, vacuum-drying the resulting mixture solution at a temperature of 40 to 80° C. through rotary-evaporation under vacuum and baking the mixture at 650 to 800° C. to obtain a carbon nanotube catalyst in which Fe, Co and Mo components are impregnated in and coated on the surface and pores of the alumina support, loading the carbon nanotube catalyst into a fluidized bed reactor and injecting at least one carbon source selected from C1-C4 saturated or unsaturated hydrocarbons, or the carbon source and a mixed gas of oxygen and nitrogen into the reactor at 500 to 900° C., and growing carbon nanotubes on the surface of the catalyst by chemical vapor synthesis using decomposition of the carbon source selected from C1-C4 saturated or unsaturated hydrocarbons.

In another example, a Mo component was first added to water, multicarboxylic acid is then added thereto, and an Fe component and a Co component are then added thereto. A concentration of the obtained clear aqueous metal solution is preferably 0.1 to 0.4 g/ml and is more preferably 0.1 to 0.3 g/ml in view of reactivity.

The vacuum drying is carried out by rotary evaporation under vacuum at a temperature of 40 to 80° C. for 30 minutes to 3 hours and the baking is then carried out at 650 to 800° C. Baking time is 30 minutes to 5 hours, but the present invention is not limited thereto.

In particular, the mixture may be aged at 45 to 80° C. while rotating or stirring before the vacuum drying. For example, the aging may be carried out for 5 hours at maximum, 20 minutes to 5 hours, or 1 to 4 hours.

Furthermore, the mixture may be pre-baked at 250 to 400° C. after vacuum-drying and before baking. Specifically, it is preferable in view of reaction efficiency that 50% at maximum, 1 to 45%, or 5 to 40%, of the total amount of the aqueous metal solution, is impregnated in an alumina support immediately before the pre-baking and the residue of the aqueous metal solution is impregnated in the alumina support immediately before the baking.

The carbon nanotube catalyst has a spherical shape having a particle diameter or an average particle diameter measured before baking, of 30 to 150 μm and a volume average particle diameter of 10 to 50 nm, but the present invention is not limited thereto.

The carbon nanotube catalyst obtained by the method has a spherical or potato bulk shape and has a structure in which the catalytic component and the active components (Fe, Co and Mo components) permeate in pores of the alumina support and are deeply coated as a monolayer or multilayer structure in the alumina.

Assuming that a particle having a particle diameter of 32 μm or less, based on particle diameter or average particle diameter, is defined as a ultrasonic fine powder, while taking into consideration particle diameter or average particle diameter range (32-95 μm) of the alumina support, the supported catalyst wherein the Fe, Co and Mo components are coated on the surface and pores of the alumina support has a measured value of a number average particle diameter, of 10% or less or 5% or less.

For reference, the ultrasonic fine powder is an aggregate of a catalyst substance and an active substance adhered to a catalyst and, which passes through a sieve, but is fundamentally different from a catalytically active substance well coated on the support in view of particle diameter and catalytic activity. The ultrasonic fine powder is an island-type aggregate adhered to the catalyst, which causes a considerably low CNT yield. Such a substance is slightly weakly adhered to the catalyst and is thus detached therefrom upon ultrasonication, thus causing production of fine powder.

As herein used, the ultrasonic fine powder amount means an amount of a fine powder of a number average particle diameter measured through a particle diameter analyzer after ultrasonication for one minute and the support is intended to include a multilayer support.

Figure 1:
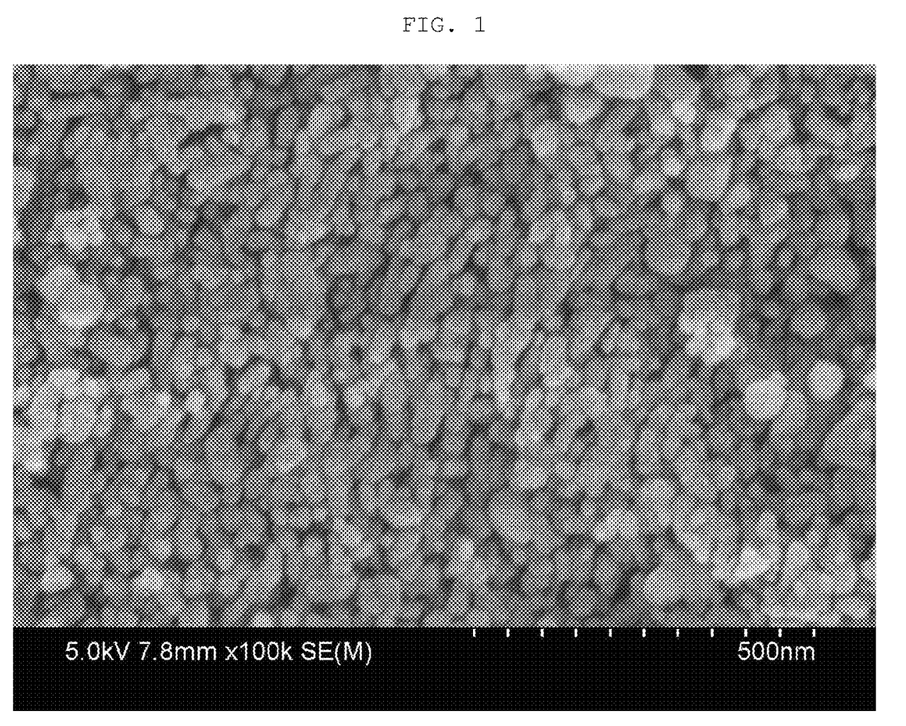
FIG. 1 is an SEM image (×100,000) of a catalyst in Example 1 according to the present invention.

In particular, the carbon nanotube catalyst obtained by the present invention is preferably a spherical shape or sphere-like potato shape in consideration of specific surface area. As can be seen from an SEM image of FIG. 1, the carbon nanotube-supported catalyst produced in accordance with the present invention also has a completely spherical shape and has a shape with a considerably high pore density (potato or spherical non-bundle type having an ellipticity of 0.9 to 1.0 and a particle diameter distribution (Dcnt) of 0.5 to 1.0).

Preferably, the carbon nanotube-supported catalyst according to the present invention has a particle diameter or an average particle diameter before baking, of 30 to 150 μm and a surface particle diameter measured by SEM, of 10 to nm, in consideration of control of CNT diameter and catalyst activity.

The carbon nanotube catalyst obtained by the method is loaded in a fluidized bed reactor and at least one carbon source selected from C1-C4 saturated or unsaturated hydrocarbons, or the carbon source and a mixed gas of oxygen and nitrogen are injected into the reactor at a temperature of 500 to 900° C.

Carbon nanotubes having a non-bundle spherical shape are grown on the surface of the catalyst by chemical vapor synthesis using decomposition of the at least one carbon source selected from C1-C4 saturated or unsaturated hydrocarbons. As a result, carbon nanotubes can be manufactured at a yield of 2,000% or higher, as can be demonstrated in Example given later.

That is, the carbon nanotube obtained by the present invention has a spherical bulk shape and a high bulk density as defined herein, thus having advantages associated with handling of CNTs in view of CNT scattering, packaging or the like.

The carbon nanotubes according to the present invention may be used as a raw material for electrical, electronic, energy fields and the like. In addition, the carbon nanotubes may be used as a reinforcing agent in plastics.

Effects of the Invention

As apparent from the fore-going, in accordance with the present invention, CNTs having a non-bundle spherical shape can be synthesized at a high yield by solving drawbacks of conventional impregnation methods for manufacturing CNTs, namely, the difficulty in improving a yield of CNTs and controlling both activity and fine powder of an impregnated supported catalyst.

DESCRIPTION OF DRAWINGS

The above and other objects, features and advantages of the present invention will become apparent from the following description of preferred embodiments given in conjunction with the accompanying drawings, in which.

BEST MODE

Now, preferred examples will be provided for better understanding of the present invention. These examples are only provided to illustrate the present invention and should not be construed as limiting the scope and spirit of the present invention.

EXAMPLE

Example 1

Production of CNT Catalyst 1

A. Preparation of Aqueous Metal Solution 0.276 g of $(NH_4)_6Mo_7O_{24}\cdot 4H_2O$ was dissolved in 10 ml of water in a flask A, 0.109 g of citric acid was added to the flask A, and 0.797 g of $Fe(NO_3)_2\cdot 9H_2O$ and 2.175 g of $Co(NO_3)_2\cdot 6H_2O$ were added thereto. That is, it could be seen that Fe was 8, Co was 30, Mo was 6.3, Fe+Co was 38 and Co/[Fe+Co] was 0.8, when an amount (2.5 g) of used $Al_2O_3$ was converted to 100, on a molar basis.

The prepared aqueous metal solution was a clear precipitate-free solution.

In addition, because 7 mol of Mo is present per 1 mol of $(NH_4)_6Mo_7O_{24}\cdot 4H_2O$, the active component Mo was 1.563 mmol, citric acid as multicarboxylic acid was 0.56 mmol and a molar ratio of the multicarboxylic acid to the active component was 0.36.

B. Preparation of Support

In addition, a flask B containing 2.5 g of $Al_2O_3$ (D50=76 micron, pore volume: 0.64 cm$^3$/g, surface area: 237 m$^2$/g, product produced by Saint Gobain) was prepared.

C. Preparation of Supported Catalyst Having First Metal Catalyst Layer from Aqueous Metal Solution and Support 6.7 g of the solution corresponding to 50% of 13.4 g of the solution contained in the flask A was added to the flask B to sufficiently support a catalytically active metal precursor on $Al_2O_3$, followed by aging while stirring in a 60° C. thermostat for 5 minutes. The resulting solution was dried under vacuum at the temperature for 30 minutes while rotating at 150 rpm. The dried catalyst was baked at 350° C. for one hour to prepare a homogeneous supported catalyst.

D. Preparation of Supported Catalyst Having Second Metal Catalyst Layer from Aqueous Metal Solution 6.7 g of the remaining metal solution contained in the flask A was added to a flask C containing the first metal catalyst layer-supported catalyst obtained in the step C to sufficiently support a catalytically active metal precursor on $Al_2O_3$, followed by aging while stirring in a 60° C. thermostat for 5 minutes.

The resulting solution was dried under vacuum for 30 minutes at the temperature while rotating at 150 rpm. The dried catalyst was baked at 350° C. for one hour to prepare a homogeneous supported catalyst.

In addition, Weight of particles passing through a 32-micron sieve with respect to the total weight of the prepared catalyst was measured to calculate a fine powder content. The fine powder content was 0 wt %. In addition, the fine powder was dispersed in water and ultrasonic-shaken at 40 watts using a particle diameter analyzer (Microtrac, bluewave) for one minute and a ratio of the number of particles having a size of 32 μm or less was measured. As a result, the ultrasonic fine powder amount was 0% based on number average particle diameter.

Figure 3:
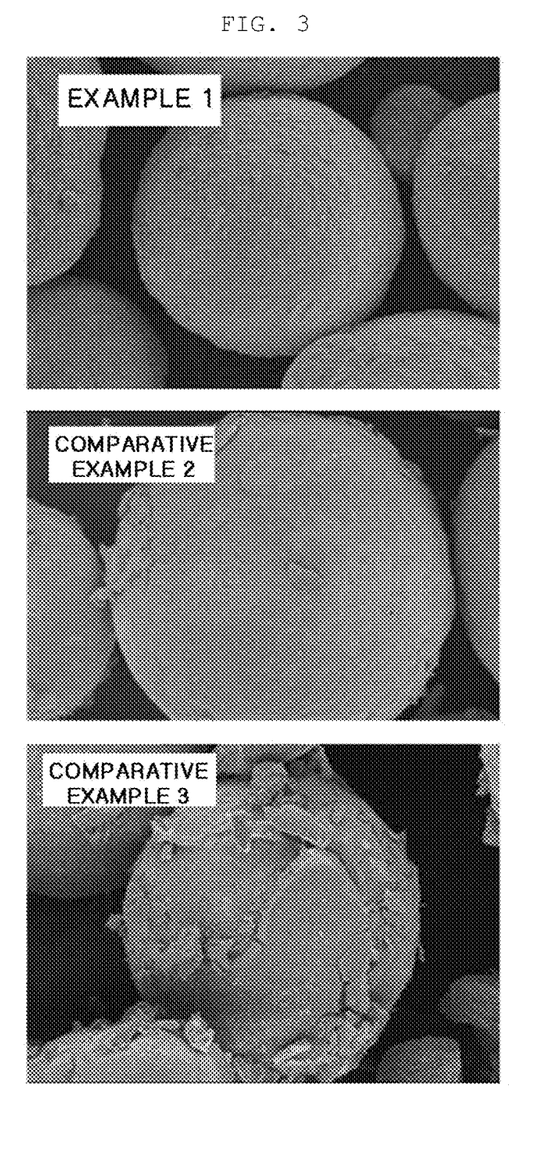
FIG. 3 is SEM images showing SEM images (×800) of impregnated supported catalysts in Example 1 (Fe/Co/Mo catalyst), Comparative Example 2 (Co/Mo catalyst) and Comparative Example 3 (Fe/Mo catalyst).

An SEM image of the catalyst thus prepared corresponds to Example 1 of FIG. 3.

Example 2

Production of CNT Catalyst 2

The same process as in Example 1 was repeated except that 0.368 g of $(NH_4)_6Mo_7O_{24}\cdot 4H_2O$, 0.906 g of $Fe(NO_3)_2\cdot 9H_2O$, 2.472 g of $Co(NO_3)_2\cdot 6H_2O$ and 0.146 g of citric acid were used in A. Preparation of aqueous metal solution of Example 1. 2.5 g of used $Al_2O_3$ was converted to 100 on a molar basis, Mo, Fe+Co, and Co/[Fe+Co] were calculated and results are shown in the following Table 1.

Weight of particles passing through a 32-micron sieve with respect to the total weight of the prepared catalyst was measured to calculate a fine powder content. The fine powder content was 0 wt %.

An amount of ultrasonic fine powder finer than the basis, 32 μm, present on the catalyst, corresponded to 0%, based on number average particle diameter.

Example 3

Production of CNT Catalyst 3

The same process as in Example 1 was repeated except that 0.368 g of $(NH_4)_6Mo_7O_{24}\cdot 4H_2O$, 2.264 g of $Fe(NO_3)_2\cdot 9H_2O$, 1.545 g of $Co(NO_3)_{20}\cdot 6H_2O$ and 0.146 g of citric acid were used in A. Preparation of aqueous metal solution of Example 1. 2.5 g of used $Al_2O_3$ was converted to 100 on a molar basis, Mo, Fe+Co and Co/[Fe+Co] were calculated, and results are shown in the following Table 1.

Weight of particles passing through a 32-micron sieve with respect to the total weight of the prepared catalyst was measured to calculate a fine powder content. The fine powder content was 4 wt %.

An amount of ultrasonic fine powder finer than the basis, 32 μm, present on the catalyst, corresponds to 8%, based on number average particle diameter.

Example 4

Production of CNT Catalyst 4

The same process as in Example 1 was repeated except that 0.230 g of $(NH_4)_6Mo_7O_{24}\cdot 4H_2O$, 3.098 g of $Fe(NO_3)_2\cdot 9H_2O$, 0.235 g of $Co(NO_3)_{20}\cdot 6H_2O$ and 0.091 g of citric acid were used in A. Preparation of aqueous metal solution of Example 1. 2.5 g of used $Al_2O_3$ was converted to 100 on a molar basis, Mo, Fe+Co and Co/[Fe+Co] were calculated and results are shown in the following Table 1.

Weight of particles passing through a 32-micron sieve with respect to the total weight of the prepared catalyst was measured to calculate a fine powder content. The fine powder content was 4 wt %.

An amount of ultrasonic fine powder finer than the basis, 32 μm, present on the catalyst, corresponded to 8%, based on number average particle diameter.

Example 5

Production of CNT Catalyst 5

The same process as in Example 1 was repeated except that the baking was performed at 750° C. in C. Preparation of supported catalyst having first metal catalyst layer from aqueous metal solution and support of Example 1, D. Preparation of supported catalyst having second metal catalyst layer from aqueous metal solution was omitted, and a concentration of the aqueous metal solution was the same as in Example 1, but 13.4 g in total of the aqueous metal solution was used once for supporting the catalyst. 2.5 g of used $Al_2O_3$ was converted to 100 on a molar basis, Mo, Fe+Co and Co/[Fe+Co] were calculated, and results are shown in the following Table 1.

Weight of particles passing through a 32-micron sieve with respect to the total weight of the prepared catalyst was measured to calculate a fine powder content. The fine powder content was 4 wt %.

An amount of ultrasonic fine powder finer than the basis, 32 μm, present on the catalyst, corresponded to 6%, based on number average particle diameter.

Comparative Example 1

Comparative Production of CNT Catalyst 1

The same process as in Example 1 was repeated except that 0.092 g of $(NH_4)_6Mo_7O_{24} \cdot 4H_2O$, 1.812 g of $Fe(NO_3)_2 \cdot 9H_2O$, 1.854 g of $Co(NO_3)_{20} \cdot 6H_2O$ and 0.036 g of citric acid were used in A. Preparation of aqueous metal solution of Example 1. 2.5 g of used $Al_2O_3$ was converted to 100 on a molar basis, Mo, Fe+Co and Co/[Fe+Co] were calculated and results are shown in the following Table 1.

Weight of particles passing through a 32-micron sieve with respect to the total weight of the prepared catalyst was measured to calculate a fine powder content. The fine powder content was 6 wt %.

An amount of ultrasonic fine powder finer than the basis, 32 μm, present on the catalyst, corresponded to 14%, based on number average particle diameter.

Comparative Example 2

Comparative Production of CNT Catalyst 2

The same process as in Example 1 was repeated except that 0.644 g of $(NH_4)_6Mo_7O_{24} \cdot 4H_2O$, 2.472 g of $Co(NO_3)_2 \cdot 6H_2O$ and 0.255 g of citric acid were used and $Fe(NO_3)_2 \cdot 9H_2O$ was not used in A. Preparation of aqueous metal solution of Example 1. 2.5 g of used $Al_2O_3$ was converted to 100 on a molar basis, Mo, Fe+Co and Co/[Fe+Co] were calculated and results are shown in the following Table 1.

Weight of particles passing through a 32-micron sieve with respect to the total weight of the prepared catalyst was measured to calculate a fine powder content. The fine powder content was 0 wt %.

An amount of ultrasonic fine powder finer than the basis, 32 μm, present on the catalyst, corresponded to 0%, based on number average particle diameter.

An SEM image of the catalyst thus prepared corresponds to Comparative Example 2 of FIG. 3.

Comparative Example 3

Comparative Production of CNT Catalyst 3

The same process as in Example 1 was repeated except that 0.644 g of $(NH_4)_6Mo_7O_{24} \cdot 4H_2O$, 3.623 g of $Fe(NO_3)_2 \cdot 9H_2O$ and 0.255 g of citric acid were used and $Co(NO_3)_2 \cdot 6H_2O$ was not used in A. Preparation of aqueous metal solution of Example 1. 2.5 g of used $Al_2O_3$ was converted to 100 on a molar basis, Mo, Fe+Co and Co/[Fe+Co] were calculated and results are shown in the following Table 1.

Weight of particles passing through a 32-micron sieve with respect to the total weight of the prepared catalyst was measured to calculate a fine powder content. The fine powder content was 21 wt %.

An amount of ultrasonic fine powder finer than the basis, 32 μm, present on the catalyst, corresponded to 48%, based on number average particle diameter.

An SEM image of the catalyst thus prepared corresponds to Comparative Example 3 of FIG. 3.

CNT Preparation Example

Carbon nanotube synthesis was tested in a fixed bed reactor at laboratory scale using catalysts for synthesizing CNTs produced in Examples 1 to 5.

Specifically, the catalyst for synthesizing CNTs produced in Example 1 was mounted in the middle of a quartz pipe having an inner diameter of 55 mm, heated under a nitrogen atmosphere to 700° C. and allowed to stand and carbon nanotubes were synthesized for one hour while flowing 180 ml in total of nitrogen, hydrogen and an ethylene gas per minute at a predetermined volume mix ratio.

The synthesized carbon nanotubes were obtained at room temperature and a content thereof was measured using an electronic scale. Reaction yield was calculated in accordance with the following equation based on weight of used catalyst for synthesizing CNTs and increment of weight of the catalyst after reaction.

CNT Yield=[Total Weight after Reaction (g)−Weight of Used Catalyst (g)]/Weight of Used Catalyst (g)×100

CNTs collected in a CNT collector after reaction for one hour in Example 1 exhibited a CNT yield of 4,121% with respect to amount of added catalyst and had a mean outer diameter of 20 nm. The produced CNT has a spherical bulk shape, as shown in FIG. 2. It could be seen that a bulk density obtained by measuring a weight corresponding to a predetermined volume was 89 kg/m$^3$.

Specifically, bulk density was calculated by filling a mass cylinder with CNTs, measuring weight of CNTs and dividing the measured weight by a volume of the mass cylinder.

In addition, ellipticity was calculated as a ratio obtained by dividing the longest diameter passing through the center of CNT by the shortest diameter through the center of CNT in a CNT SEM image. Furthermore, the produced CNTs were dispersed in distilled water, allowed to stand for three hours, number average particle diameter was measured in an absorbing mode using Microtrac particle diameter analyzer, number average particle diameter Dn10 based on 10%, number average particle diameter Dn90 based on 90%, and number average particle diameter Dn50 based on 50% were obtained and particle diameter distribution Dcnt was represented by the following Equation 1. The particle diameter distribution Dcnt of the produced CNTs was 0.88.

$Dcnt=[Dn90-Dn10]/Dn50$ [Equation 1]

Results of Examples 2 to 5 are also summarized in the following Table 1.

CNT Production Comparative Example

CNT synthesis test was performed in the same manner as in CNT Preparation Example except that catalysts of Comparative Examples 1 to 3 were used, instead of the catalysts of Examples 1 to 5.

CNTs collected in a CNT collector after reaction for one hour in Comparative Example 1 exhibited a yield of 1,508% with respect to amount of added catalyst and a mean outer diameter of obtained CNTs was 20 nm. In addition, a measured bulk density was 205 kg/m$^3$.

In addition, results of Comparative Examples 2 and 3 are also summarized in the following Table 1.

TABLE 1

| Items | Co/[Fe + Co]* (y/[x + y]) | Mo* (z) | Fe + Co (x + y) | Catalyst Fine powder (<32 μm), wt % | Ultrasonicated catalyst Number fine powder (<32 μm, %) | CNT Yield, % | CNT Bulk density, Kg/m³ | Dcnt | Shape | |
|---|---|---|---|---|---|---|---|---|---|---|
| 1 | 0.8 | 6.3 | 38 | 0 | 0 | 4121 | 89 | 0.88 | Spherical | 2-step impregnation |
| 2 | 0.8 | 8.5 | 44 | 0 | 0 | 4753 | 82 | 0.71 | Spherical | 2-step impregnation |
| 3 | 0.5 | 8.5 | 44 | 4 | 8 | 3479 | 105 | 0.64 | Spherical | 2-step impregnation |
| 4 | 0.1 | 5.3 | 35 | 4 | 6 | 2153 | 150 | 0.58 | Spherical | 2-step impregnation |
| 5 | 0.8 | 6.3 | 38 | 5 | 6 | 3400 | 110 | 0.81 | Spherical | 1-step impregnation |
| 1 | 0.6 | 2.1 | 44 | 6 | 14 | 1508 | 205 | 1.04 | Spherical | 1-step impregnation |
| 2 | 1.0 | 14.0 | 35 | 0 | 0 | 1062 | 230 | 1.28 | Spherical | 1-step impregnation |
| 3 | 0.0 | 14.0 | 35 | 21 | 48 | 973 | 248 | 0.51 | Spherical | 1-step impregnation |

*Number of moles based on 100 moles of $Al_2O_3$

As can be seen from Table above, Examples 1 to 5 satisfying a specific molar ratio exhibited a yield of CNTs synthesized using a prepared impregnated supported catalyst, of 2,000% or more and had a potato or spherical shape having an ellipticity of 0.9 to 1.0, a particle diameter distribution (Dcnt) of 0.5 to 1.0, a bulk density of 80 to 250 kg/m³ and a ultrasonic fine powder amount measured based on number average particle diameter, of 10% or less.

On the other hand, Comparative Examples 1 to 3 not satisfying a specific molar ratio had a yield of CNTs synthesized using a prepared impregnated supported catalyst, of lower than 2,000%, and had a potato or spherical shape having an ellipticity of 0.9 to 1.0, but had a particle diameter distribution (Dcnt) above 1.0, a bulk density of 80 to 250 kg/m³ and a ultrasonic fine powder about above 10%.

Furthermore, a predetermined amount of Mo improves dispersion of catalyst substances such as Fe and Co and contributes to increase in CNT yield, but excessive amount of Mo causes formation of MnO clusters, thus disadvantageously having a harmful effect on dispersion and causing production of a higher level of fine powder during preparation of catalysts.

Reference Example 1

The same process as in Example 1 was repeated except that in A. Preparation of aqueous metal solution in Example 1, 0.109 g of citric acid was added to a flask A containing a 0.797 g of $Fe(NO_3)_2 \cdot 9H_2O$ dissolved in 10 ml of water and 0.276 g of $(NH_4)_6Mo_7O_{24} \cdot 4H_2O$ and 2.175 g of $Co(NO_3)_2 \cdot 6H_2O$ were added thereto. Formation of a precipitate was observed, the precipitate was forcibly dissolved by vigorously stirring for 30 minutes, and a catalyst was prepared in the same manner as in Example 1. 2.5 g of $Al_2O_3$ was converted to 100 on a molar basis and Mo, Fe+Co and Co/[Fe+Co] were calculated. As a result, Mo, Fe+Co and Co/[Fe+Co] were 6.3, 38 and 0.8, respectively.

Weight of particles passing through a 32-micron sieve with respect to the total weight of the prepared catalyst was measured to calculate a fine powder content. The fine powder content was 9 wt %.

An amount of ultrasonic fine powder finer than the basis, 32 μm, present on the catalyst, corresponded to 18%, based on number average particle diameter.

CNTs collected in a CNT collector after reaction for one hour exhibited a yield of 1,633% with respect to amount of added catalyst and had a spherical bulk shape and a bulk density obtained by measuring a weight with respect to a predetermined volume, of 210 kg/m³.

The produced CNTs were dispersed in distilled water and were allowed to stand for three hours, number average particle diameter was measured in an absorbing mode using a Microtrac particle diameter analyzer, number average particle diameter Dn10 based on 10%, number average particle diameter Dn90 based on 90%, and number average particle diameter Dn50 based on 50% were obtained and particle diameter distribution Dcnt obtained by the following equation was 1.45.

$$Dcnt = [Dn90 - Dn10]/Dn50$$

Reference Example 1 in which a preparation order of the aqueous metal solution is changed exhibited a low CNT yield at the same content ratio of Fe/Co/Mo as in Example 1.

Reference Example 2

A co-precipitated supported catalyst was prepared in the same manner as in Example 4, except that 49 mmol of $Al(NO_3)_3 \cdot 9H_2O$, instead of $Al_2O_3$, as a support and 1.84 mmol of $NH_4HCO_3$ as a co-precipitation agent were used.

49 mmol of $Al(NO_3)_3 \cdot 9H_2O$ was converted based 100 moles and Mo, Fe+Co and Co/[Fe+Co] were calculated. As a result, Mo, Fe+Co and Co/[Fe+Co] were 6.3, 38 and 0.8, respectively.

In addition, weight of particles passing through a 32-micron sieve with respect to the total weight of the prepared catalyst was measured to calculate a fine powder content. The fine powder content was 43 wt %.

An amount of ultrasonic fine powder finer than the basis, 40 μm, present on the catalyst, corresponded to 89%, based on number average particle diameter.

CNTs collected in a CNT collector after reaction for one hour exhibited a yield of 2,860% with respect to amount of added catalyst and had an amorphous bulk shape and a bulk density obtained by measuring a weight with respect to a predetermined volume, of 47 kg/m³.

The produced CNTs were dispersed in distilled water and allowed to stand for three hours, number average particle diameter was measured in an absorbing mode using a Microtrac particle diameter analyzer, number average particle diameter Dn10 based on 10%, number average particle diameter Dn90 based on 90%, and number average particle diameter Dn50 based on 50% were obtained and particle diameter distribution Dcnt obtained by the following equation was 2.27.

$$Dcnt=[Dn90-Dn10]/Dn50$$

In addition, volume average particle diameter of carbon nanotubes was 284 μm and number average particle diameter thereof was 54 μm.

Meanwhile, Reference Example 2 using a co-precipitation method exhibited generation of a high amount of fine powder after preparation of catalyst and exhibited generation of much higher amount of fine powder upon ultrasonication at low physical strength. When catalysts are used in a fluidized bed reactor, fine powder is readily produced due to low resistance to physical collision between catalysts.

What is claimed is:

1. Particles comprising:
   an alumina support;
   a three-component catalyst that comprises a catalytic component, a multicarboxylic acid and an active component coated on a surface of the alumina support; and
   carbon nanotubes on a surface of the three-component catalyst,
   wherein the catalytic component comprises a first catalytic component and a second catalytic component,
   wherein a number of moles (x) of the first catalytic component, a number of moles (y) of the second catalytic component and a number of moles (z) of the active component satisfy ranges of $30 \leq x+y \leq 53$, $0.1 \leq y/[x+y] \leq 0.95$ and $3 \leq z \leq 13$, based on 100 moles of the alumina support,
   wherein the each of the particles has a spherical shape having a particle diameter distribution (Dcnt) of 0.5 to 1.0,
   wherein the particle diameter distribution (Dcnt) is defined by Equation 1:

$$Dcnt=[Dn90-Dn10]/Dn50 \quad [\text{Equation 1}]$$

wherein Dn90 is a number average particle diameter which is measured based on 90% in an absorption mode using Microtrac particle diameter analyzer after the particles are immersed in distilled water and then allowed to stand for 3 hours, Dn10 is a number average particle diameter measured based on 10% under the same condition as Dn90, and Dn50 is a number average particle diameter measured based on 50% under the same condition as Dn90, and
   wherein a molar ratio of the multicarboxylic acid to the active component is in a range of 0.34616 to 0.36665.

2. The particles according to claim 1, wherein the particles are a non-bundle type having an ellipticity of 0.9 to 1.0.

3. The particles according to claim 1, wherein the particles have a bulk density of 80 to 250 kg/m³, a particle diameter or an average particle diameter of 300 to 800 μm, and
   wherein a diameter of each of the carbon nanotubes is 10 to 50 nm.

4. The particles according to claim 1, wherein the three-component catalyst provides a carbon nanotube yield of 2,000% or higher.

5. The particles according to claim 1, wherein the three-component catalyst has a structure in which the first catalytic component comprising at least one selected from Fe and Ni, the second catalytic component comprising Co, and the active component comprising Mo are coated as one-layer or a multi-layer on the surface or pores of the alumina support,
   wherein the particles comprise an ultrasonic fine powder of 10% or less, and
   wherein the ultrasonic fine powder is the particles having a number average particle diameter of 32 μm or less, measured after ultrasonic-shaking for one minute by an ultrasonicator, which is set to 40 watts.

6. The carbon nanotube particles according to claim 5, wherein the carbon nanotube particles comprise the ultrasonic fine powder of 5% or less.

7. The particles according to claim 1,
   wherein the three-component catalyst is obtained from a mixture solution obtained by sequentially adding the multicarboxylic acid, the first catalytic component and the second catalytic component to the active component to prepare a clear aqueous metal solution and then adding the clear aqueous metal solution to the alumina support.

8. The particles according to claim 7, wherein the mixture solution is obtained as a supported catalyst in which the first catalytic component, the second catalytic component and the active component are impregnated in and coated on the surface and pores of the alumina support through vacuum-drying and then baking.

9. The particles according to claim 7, wherein the clear aqueous metal solution has a concentration of 0.1 to 0.4 g/ml.

10. The particles according to claim 1, wherein the multicarboxylic acid comprises at least one selected from the group consisting of dicarboxylic acid, tricarboxylic acid and tetracarboxylic acid.

11. A method for manufacturing carbon nanotubes comprising:
    sequentially mixing an active component precursor aqueous solution with a multicarboxylic acid component and a catalytic component precursor aqueous solution to prepare a clear aqueous metal solution and mixing the clear aqueous metal solution with an alumina support;
    vacuum-drying the resulting mixture at 40 to 80° C. and then baking the mixture at 650 to 800° C. to obtain a carbon nanotube catalyst in which a catalytic component and an active component are impregnated in and coated on the surface and pores of the alumina support;
    loading the carbon nanotube catalyst into a fluidized bed reactor and injecting at least one carbon source selected from C1-C4 saturated or unsaturated hydrocarbons, or the selected carbon source and a mixed gas of hydrogen and nitrogen into the reactor at 500 to 900° C.; and
    growing the carbon nanotubes of claim 1 on the surface of the catalyst by chemical vapor synthesis using decomposition of the carbon source,
    wherein the catalytic component precursor aqueous solution comprises a first catalytic component precursor aqueous solution and a second catalytic component precursor aqueous solution, a number of moles (x) of the first catalytic component precursor aqueous solution, a number of moles (y) of the second catalytic component precursor aqueous solution and a number of moles (z) of the active component precursor aqueous solution satisfy ranges of $30 \leq x+y \leq 53$, $0.1 \leq y/[x+y] \leq 0.95$ and $3 \leq z \leq 13$, based on 100 moles of the alumina support, and wherein a molar ratio of the multicarboxylic acid to the active component is in the range of 0.34616 to 0.36665.

12. The method according to claim 11, further comprising aging the mixture 45 to 80° C. before the vacuum drying.

13. The method according to claim 11, further comprising pre-baking the mixture at 250 to 400° C. after the vacuum-drying and before the baking.

14. The method according to claim 13, wherein a portion of the total amount of the aqueous metal solution is impregnated in the alumina support immediately before the pre-baking and the residue of the aqueous metal solution is impregnated in the alumina support immediately before the baking.

* * * * *